A. J. A. BENNETT.
WHEEL BLOCK.
APPLICATION FILED NOV. 5, 1908.
942,161.
Patented Dec. 7, 1909.
2 SHEETS—SHEET 1.
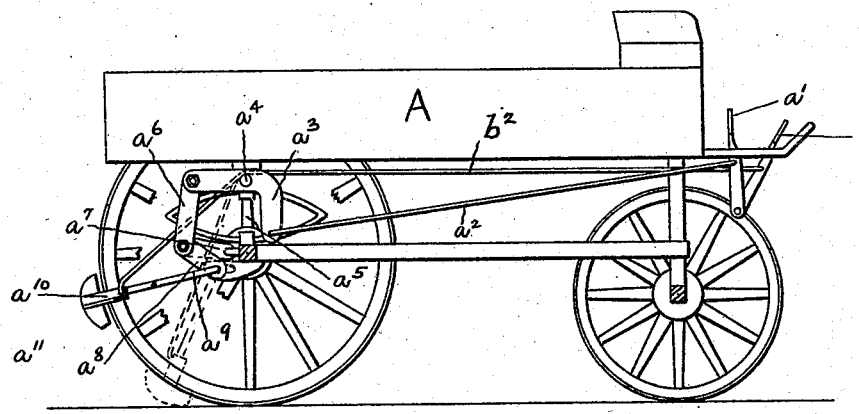
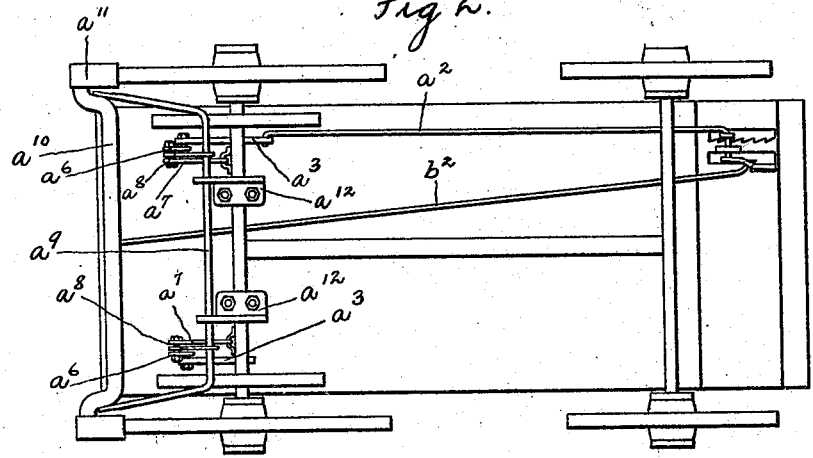
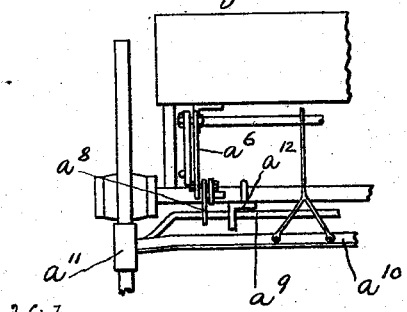
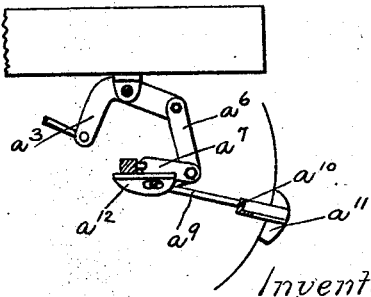
Witnesses
Agnes Dunn
Harold E. Stonebraker
Inventor:
Anna J. Allen Bennett,
by
Danforth Parry
her attorneys.

A. J. A. BENNETT.
WHEEL BLOCK.
APPLICATION FILED NOV. 5, 1908.

942,161.

Patented Dec. 7, 1909.
2 SHEETS—SHEET 2.

Witnesses
Agnes Quinn.
Harold E. Stonebraker.

Inventor:
Anna J. Allen Bennett,
by
her attorneys.

UNITED STATES PATENT OFFICE.

ANNA J. ALLEN BENNETT, OF SEATTLE, WASHINGTON.

WHEEL-BLOCK.

942,161.  Specification of Letters Patent.  Patented Dec. 7, 1909.

Application filed November 5, 1908. Serial No. 461,180.

*To all whom it may concern:*

Be it known that I, ANNA J. ALLEN BENNETT, a citizen of the United States, residing at Seattle, in the county of King and State of Washington, have invented certain new and useful Improvements in Wheel-Blocks; and I do hereby declare the following to be a full, clear, and exact description of the invention, such as will enable others skilled in the art to which it appertains to make and use the same.

My invention relates to certain improvements in wheel blocks, and is in the nature of an improvement upon my former invention disclosed in Patent No. 876,424, Jan. 14, 1908.

In my previous patent, I disclosed, generally speaking, a block adapted to be brought into coöperative engagement with the bottom of the rear wheel of a vehicle, in order to act as a brake on the same in ascending a hill, that is to say, to prevent the return movement of the vehicle in case it should stop in the course o fsuch ascent, and it is the object of my present invention to improve upon that structure, and also to combine therewith a means for bringing the block into such engagement with the wheel as to prevent or retard the forward and normal movement of the same.

A further object of the invention is to provide a single structure capable of operating in either manner as just described, and under the complete control of the driver.

A further object is to so arrange the operative parts of the structure that there shall be a set of controlling levers within easy reach of the driver of the vehicle, who may readily manipulate one or the other according to the purpose which he desires to accomplish, that is to say, when one lever is operated, upon ascending a hill, the block is moved into coöperative engagement with the bottom of the wheel to prevent any rearward movement, and when the other lever is operated, the block is moved into such coöperative engagement with the wheel as to retard the forward movement thereof.

With these several objects in view, the invention, in its preferred forms, consists in the construction hereinafter set forth in detail in the specification, pointed out in the claims, and illustrated in the accompanying drawings, in which—

Figure 5:
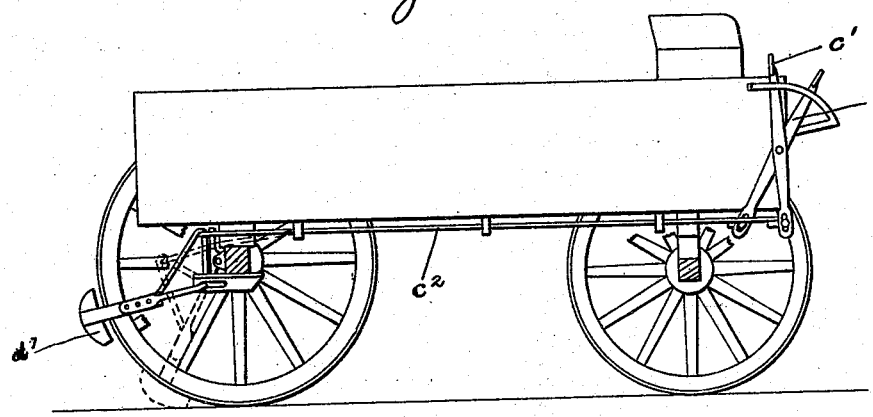
Figure 6:
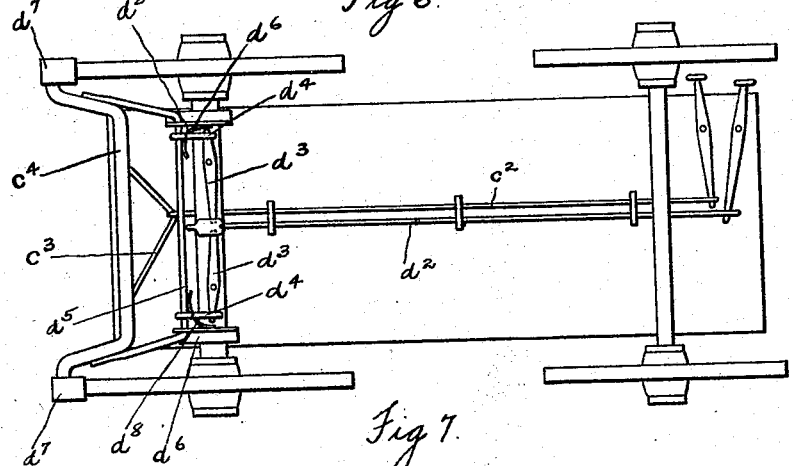
Figure 7:
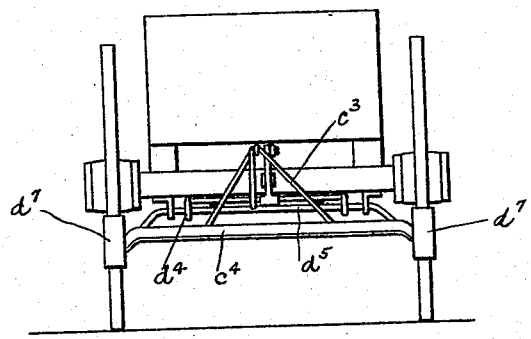

Figure 1 is a side elevation of a vehicle, with my present form of brake mechanism applied thereto; Fig. 2 is an elevation of the same looking from the bottom; Fig. 3 is a detail view in rear elevation; Fig. 4 is a detail view in side elevation, showing the position of the parts with the brake in action for retarding or preventing the forward movement of the vehicle; Fig. 5 is a side elevation, showing a slightly modified form of my invention as is used in conjunction with low bed wagons, and heavy vehicles. Fig. 6 is an elevation of the construction shown in Fig. 5, looking from the bottom; Fig. 7 is a rear elevation of the same.

Referring more particularly to the parts, in which like reference characters refer to corresponding parts in the several views, A designates the body of a wagon, to which the construction is applied.

$a'$, $b'$ are levers positioned at the front of the wagon, and within reach of the driver, for throwing the block into engagement with the wheel to retard forward movement, and moving the same into engagement with the bottom of the wheel to prevent rearward movement respectively.

Connected to the lever $a'$ is a connecting rod $a^2$, which is in turn connected to the angle-arm $a^3$. The angle-arm $a^3$ is pivoted at $a^4$ to the standard $a^5$, and has pivoted thereto a link $a^6$. $a^7$ is an additional link which is pivoted to the link $a^6$ and connects with the body of the vehicle. $a^8$ is a link also pivoted to the link $a^6$ for a purpose presently to be mentioned. The levers $a^3$, $a^6$, $a^7$ and $a^8$ are duplicated at each side of the vehicle as indicated in Fig. 2, the operating connecting rod $a^2$ being arranged at one side only.

Connecting and passing through the links $a^8$ is a rod $a^9$ which is secured at its ends to the bar $a^{10}$ carrying the wheel-blocks $a^{11}$. The bar $a^9$ is supported by and moved in the slotted angle-plates $a^{12}$, which are secured to the bottom of the wagon. Also connected to the wheel-block carrying bar $a^{10}$ is a strap $b^2$ which is connected to the operating lever $b'$. When the lever $b'$ is in its normal or forward position as indicated in Fig. 1, in full lines, the blocks $a^{11}$ are held up and off of the ground, but upon releasing the lever $b'$ from the engaging rack or other suitable holding means, the blocks $a^{11}$ are permitted to drop to the position indicated in dotted lines and thereby prevent any rearward movement of the vehicle upon ascending a hill or the like.

By the peculiar relation of the pivotal point of the wheel-blocks $a^{11}$, with relation to the circumference of the wheel, it will be noted that in the lateral position of the wheel-blocks, they are in engagement with the wheel, but when raised, are removed from the periphery of the wheel. When in such raised position, if it is desired to bring the blocks against the wheel, to retard the same against normal or forward movement of the vehicle, the lever $a'$ is operated, and through the connecting rod $a^2$ and the series of links, already described, the rod $a^9$ is moved forwardly in the slots in the angle-plates $a^{12}$, and causes the wheel-blocks $a^{11}$ to be brought up into engagement with the wheels, all as is apparent from the drawings.

Thus, I have provided a single device, controlled by a pair of levers, and in such a manner that the operation of one lever results in the application of the wheel blocks at one portion of the wheel, while the operation of the other lever effects application of the wheel-blocks at another point on the wheels, these being susceptible of movement under the different conditions already explained.

The construction heretofore described, is employed preferably in connection with spring-wagons, and other similar light wagons, but when applied to low bed wagons, or heavier vehicles, I prefer to employ the construction disclosed in Figs. 5, 6, and 7 where $c'$, $d'$ designate the levers for moving the blocks down to engage the bottom of the wheel, and for moving them forwardly to prevent or retard forward movement, respectively. Connected to the lever $c'$ is a connecting-rod $c^2$ which in turn connects with the rod $c^3$ secured to the wheel-block carrying-bar $c^4$.

The lever $d'$ is connected through the rod $d^2$ to the levers $d^3$ which operate through links $d^4$ upon the rod $d^5$ also secured to the block-carrying-bar $c^4$. The rod $d^5$ is supported by and movable in the slotted angle-plates $d^6$. Thus, a movement of the lever $d'$ operates to force the connecting rod $d^2$ rearwardly and the outer ends of the levers $d^3$ forwardly, together with the links $d^4$, whereby the rod $d^5$ is also moved forwardly and carries the wheel-blocks $d^7$ into engagement with the wheels. This is under the condition when the wheel-blocks are held up or in normal position by the lever $c'$, when the wagon is traveling along under ordinary conditions.

When it is desired to prevent rearward movement of the wheels, as when traveling up a hill, the lever $c'$ is moved to permit the blocks $d^7$ to engage between the bottom portions of the wheel and the ground.

I have shown my invention in its preferred embodiment, with slight modifications, but it is to be understood that other changes and departures may be made, which are nevertheless contemplated by my present improvement, and are to be included within the scope of the invention.

What I claim and desire to secure by Letters-Patent is:

1. A brake mechanism for vehicles including brake-shoes, a bar carrying said brake shoes, a rod carried by said bar, a pair of levers, a connecting-rod, plurality of links joining the connecting-rod and previously mentioned rod, and a strap connecting the other lever and the shoe-carrying bar.

2. A brake mechanism for vehicles including brake-shoes, a bar carrying the same, a rod secured to said bar and engaging slotted angle-plates on the vehicle, a lever, a connecting-rod secured thereto, link connections between the previously mentioned rod and said connecting-rod, an additional lever, and a strap connecting said additional lever with the shoe-carrying bar.

In testimony whereof, I affix my signature, in the presence of two subscribing witnesses.

ANNA J. ALLEN BENNETT.

Witnesses:
 MARY G. HOFFMAN,
 R. L. BLEWETT.